United States Patent [19]
Crockett

[11] Patent Number: 4,932,928
[45] Date of Patent: Jun. 12, 1990

[54] SHIFTLESS, CONTINUOUSLY-ALIGNING TRANSMISSION

[76] Inventor: Samuel J. Crockett, 20456 Lake Lindsey Rd., Brooksville, Fla. 34601

[21] Appl. No.: 279,963
[22] Filed: Dec. 5, 1988
[51] Int. Cl.$^5$ .............................................. F16H 47/08
[52] U.S. Cl. ........................................ 475/51; 475/47
[58] Field of Search ................ 74/677, 682, 687, 688, 74/793, 731, 665 D

[56] References Cited

U.S. PATENT DOCUMENTS

| | | | |
|---|---|---|---|
| 2,460,081 | 1/1949 | Goodchild | 74/688 |
| 2,523,619 | 9/1950 | Grebb | 74/793 X |
| 4,213,352 | 7/1980 | Crawford | 74/793 X |
| 4,281,564 | 8/1981 | Hill | 74/677 X |
| 4,369,672 | 1/1983 | Ohtsuka | 74/688 |
| 4,472,984 | 9/1984 | Cook | 74/793 X |
| 4,507,985 | 4/1985 | Morimoto et al. | 74/731 X |
| 4,825,721 | 5/1989 | Gobriele | 74/688 X |
| 4,833,942 | 5/1989 | Whalen | 74/682 |

*Primary Examiner*—Dwight Diehl
*Attorney, Agent, or Firm*—Dowell & Dowell

[57] ABSTRACT

A continuously-variable transmission comprising at least two operatively interconnecting planetary gearsets that are interposed between a modified torque converter and a work load with the input power divided into two different input sources. A first input drive shaft engages the driven converter housing and delivers torque to the sun gears of the planetary gearsets and a coaxial hollow drive shaft engages a turbine member of the converter and delivers hydro-kinetic torque to drive the carrier of one of the planetary gearsets which is a mechanical torque/speed modulator used to control ring gears which are meshed with each planetary gearset. At least a second planetary gearset acts as a variable-ratio transmission that has its ring gear speed varied by the modulating ability of the other gearset.

9 Claims, 2 Drawing Sheets

SHIFTLESS, CONTINUOUSLY-ALIGNING TRANSMISSION

FIELD OF THE INVENTION

This invention is generally directed to power transmissions for automotive vehicles and more particularly to continuously-variable all-gear-train types, employing a new type planetary unit and means of driving and controlling it to provide variable output torque and be able to provide mechanical relief to the engine to allow it to try to maintain its torque producing speed while reducing the speed of the output drive shaft automatically to the optimum range without the assistance of shifting devices, computers or other sensing devices used in the conventional type automatic transmissions to change gear ratio between the input torque and the output drive shaft; and to provide a transmission that is continuously-variable from direct-drive ratio to the lowest ratio engineered into the gearing of the unit.

HISTORY OF THE PRIOR ART

Since the internal combustion engine operates efficiently within a very limited RPM band, some type of gear changes have to be brought about to change the ratio between the engine and the work load to keep the engine from stalling. Also, the conventional internal combustion engine is not reversible; and therefore transmissions are important to their efficient operation. These transmissions have been developed in different operating styles. Progressive and Selective gear trains have been used; then came the automatic transmissions that use a torque converter and sensors, vacuum operated modulators, governors, etc., to predetermine a shift of the gear ratio. Recently, a continuously-variable transmission (CVT) has been produced, using variable diameter V-type pulleys and belts and also flat pulleys and belts. However, this type of transmission can only be used on small horsepower engines.

No prior art transmissions have been patented at the present time, to my knowledge, using only a continuously-enmeshed gear train to produce variable gear ratio instead of using V-type pulleys and belts and one that can provide a much lower ratio than can be obtained by using the belt and pulley type transmission and one that can also be applied to large, high-torque engines since it uses a mechanical gear train instead of belts.

SUMMARY OF THE INVENTION

A continuously-variable gear-type transmission comprising a modified torque converter capable of providing load dividing characteristics by producing two distinctly different input torque drive trains, which differ from the differential or planetary mechanical type load divider, in that both input torque members can react against each other but will not go into a freewheel mode or allow one member to permit a retrograde rotation of one of the members it is driving like the mechanical load divider employing a planetary or differential gear train for the same purpose to equalize the input torque and deliver it proportionately for output driving purposes. The planetary unit and the differential unit will spin through itself, whereas the modified torque converter will continue to provide driving force to both its members by utilizing the rotation of both the converter housing and the kinetic force delivered to the turbine member simultaneously.

It is the primary object of this invention to provide a transmission that is small, rugged, light-weight and requiring considerably less materials and parts than other transmissions to produce continuously-variable ratio between the prime mover and the work load; and a transmission that can be compounded by connecting two units together for use with heavy-duty vehicles that will give an extremely low range and be variable in operation.

Another object of this invention is to provide a transmission that is small enough to be used with the transversely-mounted engines in a small space, and when used with the conventional rear wheel drive vehicles that it will be small enough to eliminate most of the obstruction in the front floor of the vehicle.

A further object of this invention is to provide a transmission with continuously-enmeshed gearing that will provide better fuel economy by allowing the engine to perform at its most efficient RPM and to provide a fully mechanical engine retardation process when the vehicle is in a drifting mode such as descending long down-hill grades and will relieve brake wear considerably.

BRIEF DESCRIPTION OF THE DRAWINGS

FIG. 1. is a diagrammatical cross-section of the vehicle transmission of the present invention as it is shown connected between a source of power and a vehicle drive shaft or work load, showing the deployment of the planetary transmission unit 3 engaged to a torque/-speed modulator unit 3a.

DESCRIPTION OF PREFERRED EMBODIMENTS

Clockwise (CW) and counter-clockwise (CCW) rotation, which is referred to very frequently, is established looking from the input end of the transmission toward the output end or torque delivery shaft.

Figure 1:
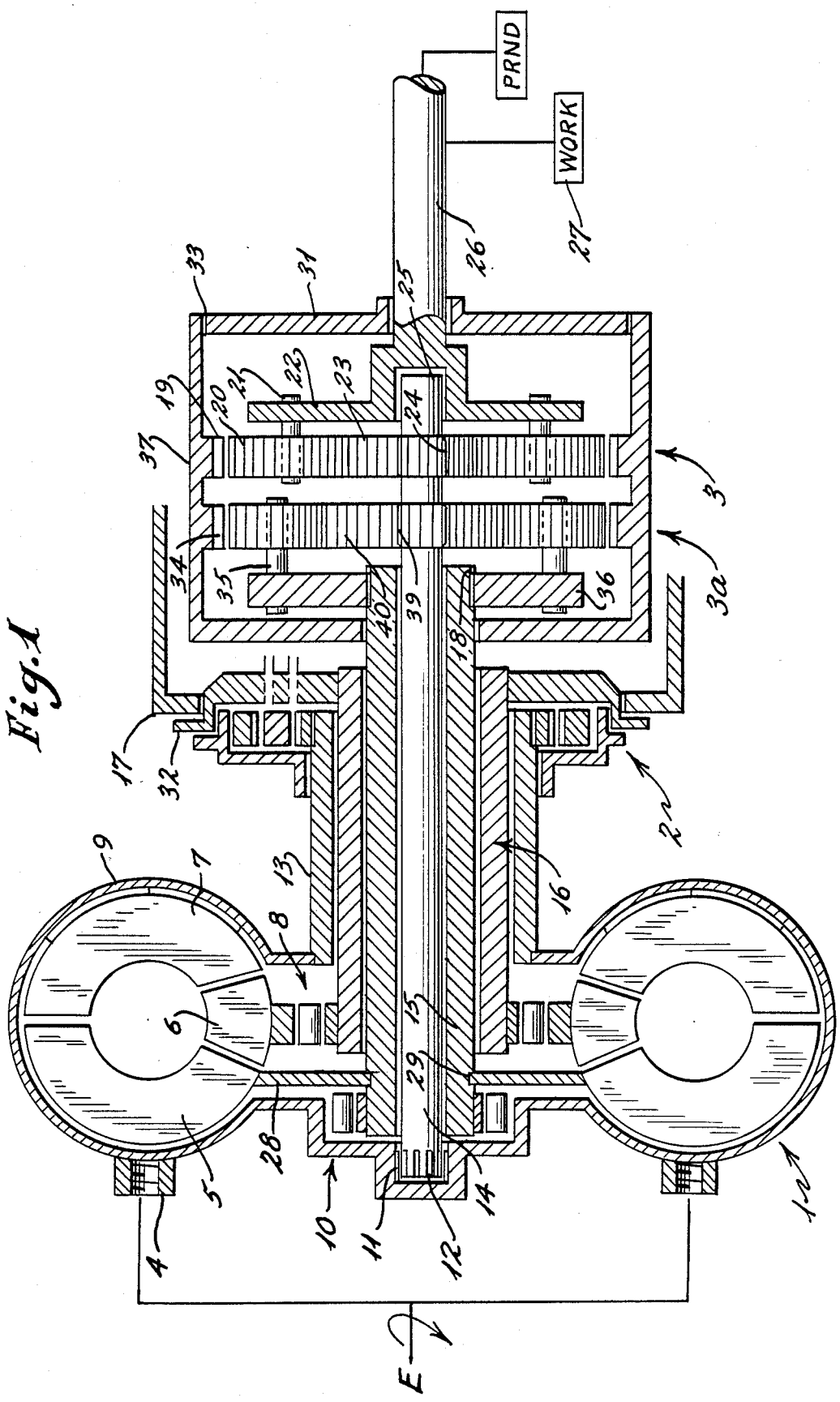

With reference to the drawings, FIG. 1. is a cross-section through the entire transmission and included in FIG. 1. is a detail of the planetary transmission 3, showing a power driven sun gear 23, a planet carrier 22 fitted with planet pinions 20, and a mobile ring gear 19. The mobile ring gear 19 has no clutches or servo brake bands to hold it as are used in the automatic transmissions. A torque converter case 9, shown in FIG. 1. drives the input drive shaft 14 that is shown disconnected from the converter at lines E—E in FIG. 2. and the turbine drive shaft 15 is shown disconnected from the converter 1 at lines F—F, FIG. 2.

In operation, sun gear 23 is driven by input shaft 14 and splines 24; and the ring gear 19 is driven by the turbine drive shaft 15 by splines 18 and carrier 36 and the ring gear support member 37. If shafts 14 and 15 are moving at the same speed, the transmission is being driven in direct drive, because the planet pinions 20 are caged between the sun gear 23 and ring gear 19 that are moving at the same speed, preventing pinions 20 from rotating on their planet axles 21 and the planet axles 21 are mounted in the planet carrier 22 and force it to move at the same speed and thereby drive the output shaft 26 to perform work in direct drive.

If an increased work load is placed on drive shaft 26, it will cause it to be slowed down although the engine E is still moving at the same speed. Something has to give way when shaft 14 and shaft 26 start moving at different speeds. What happens is the extra work load on shaft 26 actually overpowers the turbine 5 and turbine drive shaft 15 by slowing the carrier 22 and axles 21, forcing pinions 20 to start moving around sun gear 23.

This causes the ring gear 19 and support member 37 and the turbine member 5, FIG. 1., to slow down and permit torque multiplication to develop in the transmission gearing while the engine E is still maintaining its speed and trying to develop torque to bring the vehicle and drive shaft 26 back up to direct drive. The speed of the vehicle changing up and down causes the drive shaft 26 to also change speed; and in doing so it alters the ratio between the input speed of engine E and the output shaft 26 through action of the planet pinions 20 operating between a power driven sun gear 23 and a power driven ring gear 19 and forcing their planet axles 21 to move the carrier 22 and shaft 26 accordingly. In FIG. 1., a torque/speed modulator unit shown as 3a is geared to the transmission 3 to provide a better response to the engine input and prevent the turbine 5 from being driven CCW when stopped. The turbine shaft 15 can not be connected directly to ring gear 19 to control it for this reason.

In the past, no one has made much use of the planetary gear train without some means of holding the ring gear member, either by having it fixed to a stationary housing or by using a clutch or brake application to control it. The present transmission does not immobilize the ring gear in this manner and does not use clutches or brakes for control of the ring gear.

For the purpose of providing a much quicker understanding of how this present transmission works, the following disclosure is made:

"The art involved in the present transmission to produce variable ratio between the input rotation from the engine "E" and the output drive shaft is to be able to *VARY* the speed of the ring gear member up or down *during* operation, without retrograde action, and the movement of the ring gear will provide a *VARIABLE* react point on the ring gear for the planet pinions to work against, using the planet pinion axles as a variable fulcrum point to vary the speed of the carrier member to drive the output drive shaft."

Slowing the ring gear 19 while the sun gear 23 is still moving at input engine speed is theoretically like applying a larger ring gear for the planet pinions to operate against, because the slower action of ring gear 19 provides more teeth for the planet pinions 20 to work against while forcing the carrier 22 around slower during the same time frame, permitting the carrier 22 to move slower while the engine speed remains the same and thereby developing torque multiplication.

With continued reference to the drawings, FIG. 1. shows a modified torque converter 1; a conventional gear pump 2; and the transmission gearing 3 and a torque/speed modulator 3a and a partially constructed housing 17.

The gearing shown as 3a, FIG. 1. is the construction of the mechanical torque/speed modulator; and its task is to direct the limited slippage or slowing of the turbine 5 for the purpose of relieving or slowing of the CW speed of the ring gear 34 and further slow ring gear 19 that is fixed to the same ring gear support 37, to provide torque multiplication for the engine E by permitting the sun gear 23 to be able to turn more times than the output shaft 26 when developing torque; and in order to accomplish this, the engagement point on ring gear 19 provided for pinions 20 to work against must be slowed down in proportion to the speed of sun gear 23 to permit the planet pinions 20 to start revolving on their axles 21 and not be able to force the carrier 22 around CW as fast as it travels in direct drive ratio when shaft 26 and input shaft 14 are moving at the same speed. The sun gear 40 is fixed to and driven by input shaft 14; and axles 35 are fixed to and driven by carrier 36 by splines 18 and also by the shaft 15 and the turbine 5; and when turbine 5 slows down, it slows axles 35 and starts pinions 38 moving CCW on their axles to relieve the forward speed of ring gear 34 and ring gear 19 and maintains a positive mechanical engagement for the entire gear train of the transmission 3 to provide positive driving force to the carrier 22 and shaft 26, using the planet pinion axles 21 as a variable or floating fulcrum point.

The transmission gear train shown in 3 in FIG. 1. is a very special arrangement of the planetary gear system in that it has a mobile ring gear 19 that is controlled by reaction forces between the input torque from the engine E and the speed and load of shaft 26 that varies up or down under varying amounts of loading; and the means to handle the extra loading is controlled through the torque/speed modulator 3a because it forces the ring gear 19 to slow down in order to increase the torque on shaft 26 or to speed up when the load lightens up sufficiently to produce a directdrive ratio between the engine and output shaft 26.

The sun gear 23 is fixed to input drive shaft 14 by splines 24 and moves at the same speed as the engine. Sun gear 23 engages and drives planet pinions 20 against ring gear 19, forcing them to drive their axles 21 CW and drive the carrier 22 and shaft 26 in the same direction. The torque converter 1 has a case or housing 9 that is driven by the input torque of the primer mover or engine designated as "E" by being mechanically attached to the case 9 by driving lugs 4 to cause the converter housing 9 to rotate at input speed. The housing 9 drives a coaxial hollow drive shaft 13 that engages the drive gear 30 of pump 2 to cause the pump to produce hydraulic pressure to maintain fluid requirements and pressure within the housing 9 of the converter 1.

A stator support shaft 16 is fixed to the transmission case 17 by being fitted into the pump housing 32 and the housing 32 is fixed to the main transmission housing 17 to keep the stator support 16 stabalized. The stator support shaft 16 is fitted with a one-way roller clutch 8 at its input end and it is centered under the converter stator member 6; and the stator 6 is permitted to turn in the same direction the housing 9 is being driven when it is not required to multiply torque within the converter 1.

If slippage develops, the converter 1 starts multiplying torque, and the stator 6 locks up against CCW rotation through action of clutch 8 and starts directing the fluid within the converter 1 so it will strike the turbine blades 5 with increased force to drive the turbine blades 5. The impeller blades 7 are fixed to the case 9 and move at the same speed as the case. The turbine blades 5 are fixed to turbine drive member 28 and member 28 engages turbine drive shaft 15 by splines 29 at the front end of the converter 1 to drive the shaft 15. The other end of the turbine drive shaft 15 is splined to modulator carrier member 36 by splines 18 to drive carrier 36 clockwise in the same direction the engine E is rotating to force carrier axles 35 to move planet pinions 38 in a clockwise direction.

The front end of the converter case 9 is fitted with female splines 11 and they mesh with male splines 12 that are out on the converter drive shaft 14. This spline arrangement couples splines 11 and 12 together and allows the engine E to drive the converter drive shaft 14 at engine speed or to help retard the vehicle by compression when drifting.

The engine-driven converter shaft 14 extends through the turbine drive shaft 15 and into the sun gear 23 and is mechanically engaged to sun gear 23 by splines 24; and the engine driven shaft 14 has an extension 25 to support a portion of the planet carrier 22 and the output drive shaft 26 that engages work load 27 to perform work.

The input drive shaft 14 and the output drive shaft 26 are not engaged at the point where they are journaled for the reason that they rotate at different speeds while developing torque, however, they move at the same speed in direct drive.

The sun gears 40 and 23 shown on drive shaft 14, in FIG. 1, can be made on the shaft 14 and eliminate both internal and external splines that engage them to shaft 14.

A sun gear 40 is fixed to the drive shaft 14 by splines 39 and sun gear 40 is driven clockwise by shaft 14 at the same speed of the shaft and also the same speed as the sun gear 23 moves. Sun gear 23 drives the planet pinions 20 of the transmission 3 and the sun gear 40 drives the planet pinions 38 of the speed/torque modulator unit 3a.

It is evident from the foregoing that torque from engine crankshaft E' drives the converter 1 by lugs 4 and that the converter housing 9 is coupled to the converter drive shaft 14 by splines 11 and 12 to drive the shaft 14 mechanically and the rotation is further extended to sun gears 40 and 23 to drive them in a clockwise direction and the sun gear 40 applies force to planet pinions 38 mounted on planet axles 35 to drive them; and sun gear 23 applies force to planet pinions 20 journaled on pinion axles 21 to drive them.

The rotation of converter 1 causes turbine 5 to deliver rotation through member 28, splines 29 and shaft 15 to drive the modulator carrier 36 to which planet axles 35 are fixed. Ring gear support 37 that has ring gears 19 and 34 fixed to it is fixed to ring gear support 31 by lugs 33 and one end of the ring gear support 37 is journaled around shaft 26 and the other end journaled around turbine drive shaft 15; and it would appear that the ring gears 19 and 34 would be wanting to freewheel counter-clockwise since each end is journaled freely; but with sun gear 40 being driven CW and carrier 36 and axles 35 moving in the same direction, pinions 38 are really dragging the ring gear 34 slowly in a CW direction also.

Since both ring gears 19 and 34 are fixed to the same support member 37, this forces ring gear 19 to move in the same direction, imparting rotation to shaft 26 through action of pinions 20 walking around inside ring gear 19 and forcing their axles 21 CW to drive the carrier 22 and shaft 26 in the same CW direction.

If a change in the work load is encountered, increasing the load, the turbine 5 will start slipping to some extent or slowing down in proportion to the speed of converter housing 9, because it is being overpowered by the work load and forced to slow down because the engine E is still applying the same speed to sun gear 23 and something has to give way to keep from breaking, and the planet pinions 20 start relieving on their axles 21 and the relief rotation is reflected against the turbine 5, because it can give against the kinetic force applied to it but the sun gear 23 can not give because it is mechanically fixed to rotate with the engine at input speed; and the housing 9 will keep driving shaft 14 at the same speed while the turbine shaft 15 is slowing. A backward or slowing motion that is delivered to shaft 15 causes the carrier 36 to slow, and with the sun gear 40 that is fixed to the drive shaft 14 still moving fast, it causes the planet pinions 38 to start moving CCW on their axles 35 and start slowing down ring gears 34 and 19; and this slowing causes action to start up in the transmission 3, because the planet pinions 20 will also be forced CCW by action of the sun gear 23 moving CW with shaft 14; and this action between the sun gear 23 and the pinions 20 permits the carrier 22 to slow down accordingly along with the output drive shaft 26.

In the drawing FIG. 1., the sun gear 40 is shown as being larger than its companion sun gear 23. This larger size sun gear 40 directs more CCW slowing of the turbine 5, because pinions 38 are forced to move CCW against sun gear 40 when the turbine 5 is slowing, while at the same time the sun gear 40 is continuing its speed.

Figure 2:
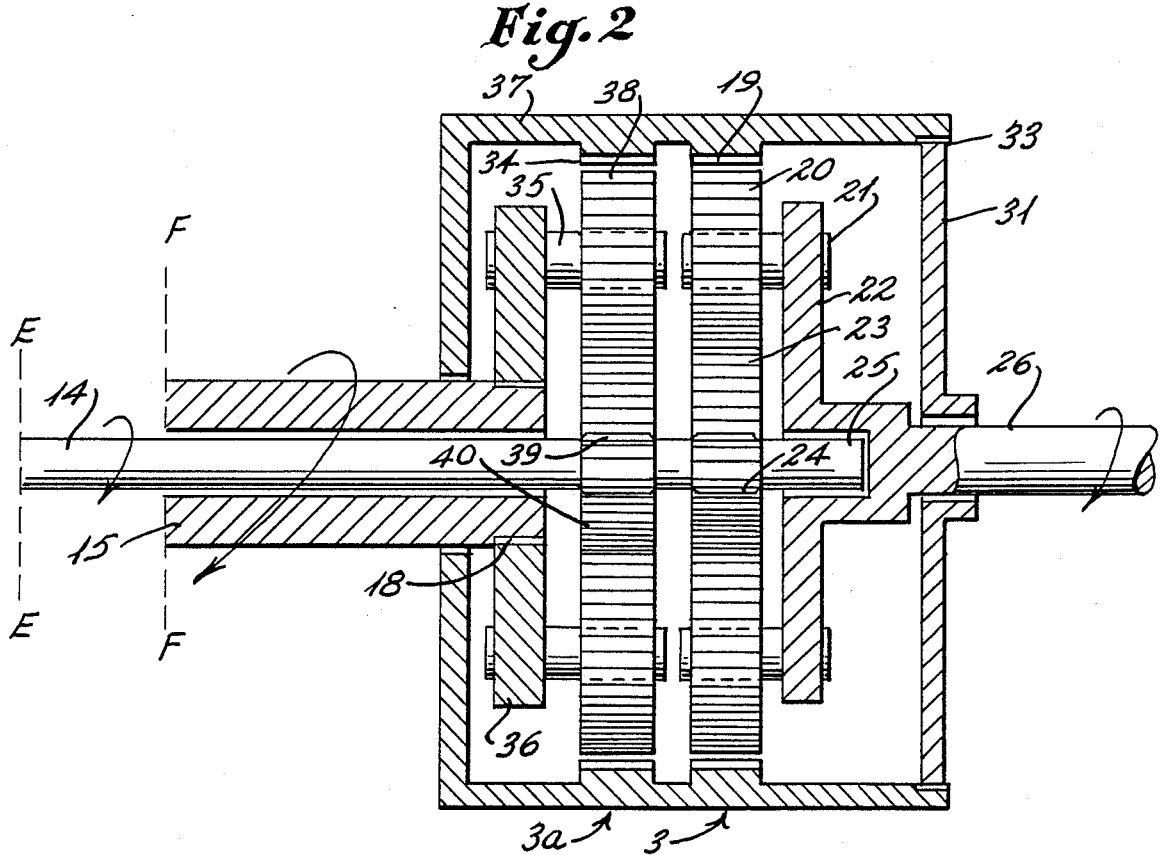
FIG. 2. is a cross-section through the gear train of the transmission and the torque/speed modulator unit as shown in FIG. 1. but a difference in the drawing in FIG. 2. shows all the pinions having the same diameter and all the ring gears having the same diameter. The turbine drive shaft is shown disconnected at lines F—F. The converter drive shaft is shown disconnected at lines E—E.

FIG. 2. shows both sun gears and also the pinions being the same size. The reason for showing this difference is to explain the effect on the turbine portion of the converter 1 when a braking stop is made by holding the output shaft 26 stationary or immobile. If the gears are of equal diameter as shown in FIG. 2., the turbine will be held stationary as well as the drive shaft 26 when stopped; but with a larger sun gear 40, the turbine 5 slows down much less and is still permitted to move CW some.

As shown in FIG. 2. where all the gears are the same size, holding the shaft 26 stops carrier 22 and pinion axles 21; but with the engine E still driving the sun gear 23, planet pinions 20 forces ring gear 19 and 34 in a CCW direction. This action will force carrier 36 and turbine shaft 15 and turbine blades 5 to stand still at low engine speed while shaft 26 is held. In FIG. 1. this same action will also force ring gears 19 and 34 CCW, but sun gear 40 being larger than sun gear 23 will cause the pinions 38 to be driven against the ring gear 34, forcing axles 35 and carrier 36 to move forward with the drive shaft 14 in a CW direction but not as fast as the shaft 14 and sun gear 40 is turning.

By using a large sun gear 40 and small pinions 38, only a small slowing of turbine 5 will reflect a greater slowing of the ring gears 34 and 19 and increase the torque multiplication more quickly in transmission 3. The retarded CW movement of turbine 5 while using the larger sun gear 40, with the drive shaft 26 still being held, eliminates a lot of the creeping tendency and heat generation during the time the vehicle is being retarded by braking, because the turbine 5 is permitted to move some in the direction it is being driven by the impeller 7.

FIG. 2. is a cross-section through the transmission 3 and the torque/speed modulator unit 3a. FIG. 2. shows the sun gear 40 of the modulator 3a and the sun gear 23 of the transmission 3 as being the same size for reasons previously described, which permits the carrier 36 and turbine 5 to stand still during a brief stop by holding shaft 26. This occurs because sun gear 23 drives planet pinions 20 on their installed axles 21, forcing ring gear 19 and also ring gear 34 to move CCW in relation to the speed of sun gear 23.

Since drive shaft 14 is driving both sun gears 40 and 23 at the same speed, FIG. 2., both sets of planet pinions, 20 and 38 respectively, are forced to rotate CCW because axles 21 are installed by carrier 22 and shaft 26; and axles 35 are also halted because its planet pinions 38 are caged between ring gear 34, moving one direction, and sun gear 40 moving in the other direction, forcing axles 35 to stand still and hold turbine 5 stationary while pinions 38 spin and freewheel on axles 35.

Figure 3:
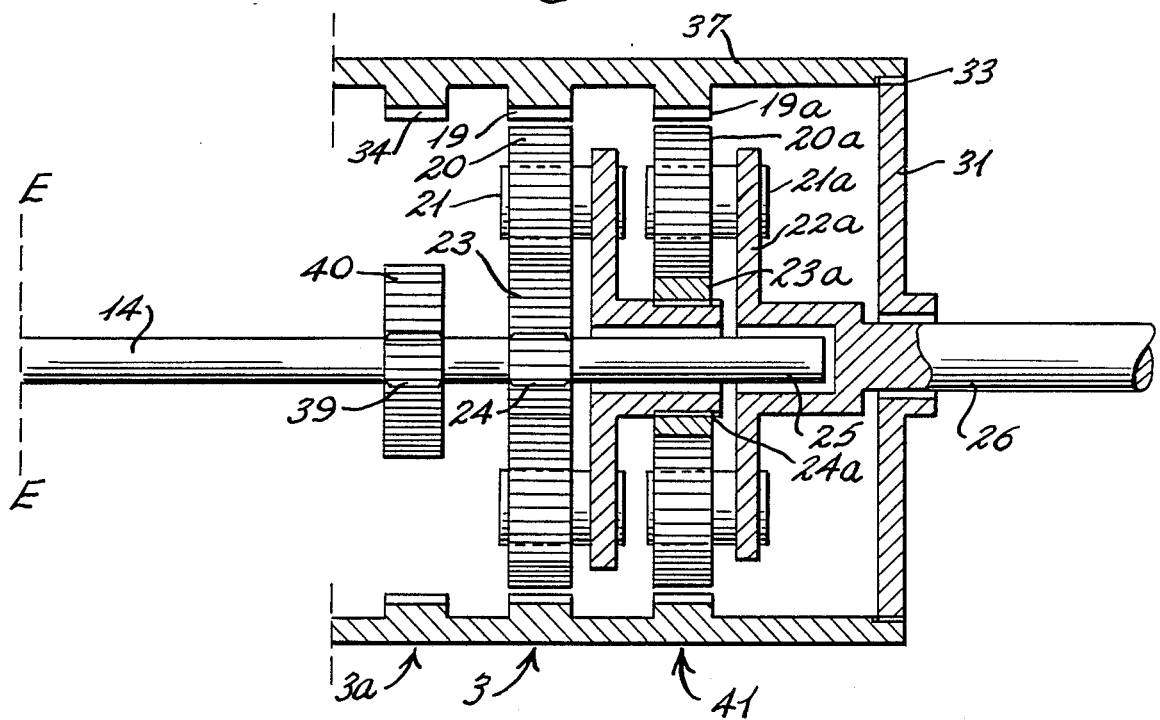
FIG. 3. is a sectional view showing a partial construction of the torque/speed modulator unit 3a and the transmission planetary unit designated by arrow 3, and a method of compounding an additional planetary unit, designated by arrow 41, for the purpose of providing extremely low gear reduction.

FIG. 3. shows a portion of the modulator unit 3a and illustrates a method of providing extremely high torque output for shaft 26 by compounding the transmission with an additional unit 41, with the ring gear 19a fixed to the same ring gear support member 37. Planet pinions 20a engine ring gear 19a fixed to the same ring gear support member 37. Planet pinions 20a are mounted rotatably on pinion axles 21a fixed in carrier member 22a and supported on a longer extension 25 of the input shaft 14, and sun gear 23a is fixed to the output carrier 22 by splines 24a. The reduced speed and increased torque is delivered through output shaft 26, which is shown in FIG. 1. as being fixed in carrier 22 instead of 22a as is shown in FIG. 3. for this reduction purpose. This type of reduction will only be needed for heavy-duty equipment.

In order for the sun gear 23 to drive the output shaft 26, its rotation must force planet pinions 20 to walk around inside the ring gear 19 and force the planet pinion axles 21 forward CW driving the carrier 22, to which they are fixed and also the output shaft 26. If ring gear 19 is held stationary, this will permit output shaft 26 to be driven, but it will just have the same characteristics as that of a speed reducer instead of a variable ratio drive train.

The torque converter 1 employes the use of two different one-way clutch units, 8 and 10 respectively; however, they do not conflict or overlap their control when the converter 1 is being driven by the input torque or when in a drifting mode.

Clutch member 8 will lock the stator 6 from being driven in a reverse or counter-clockwise direction while multiplying torque so it can direct the flow of fluid from the impeller 7 to the turbine 5 to drive the turbine.

When the speed of the vehicle and drive shaft 26 exceeds the input RPM from engine E, causing the vehicle to be in a drifting mode, clutch 10 will lock up the turbine drive shaft 15 with the housing 9 and engine drive shaft 14 by using the housing 9 in the process because the converter housing 9 engages the engine drive shaft 14 by means of splines 11 and 12; so when turbine 5 is being forced forward while drifting, clutch 10 will lock shaft 15 and 14 together as a single unit through use of housing 9; and clutch 8 will be free and have no effect on the stator 6.

This lock-up of clutch 10 while in a drifting mode is caused by the gearing of the transmission 3 being locked up also when drifting. The sun gear 23 is fixed to the engine drive shaft 14 by splines 24 and moves with the engine input. While drifting, the momentum of the vehicle drives the shaft 26 and planet carrier 22 and planet axles 21, forcing planet pinions 20 to be driven around the sun gear 23 that is mechanically fixed to the engine. Since the vehicle is moving faster than the engine when drifting, pinions 20 are forced to rotate CW against the sun gear 23 faster than gear 23 is moving, which action applies reacting force against the ring gear 19, trying to force it clockwise also; but it can not move forward because when force is applied by planet pinions 20 to drive it forward, it causes clutch 10 to lock the converter case 9 and the turbine drive shaft 15 together by action of the one-way clutch 10 at any time the drive shaft 15 tries to outrun the converter housing 9. This force that pinions 20 applies to ring gear 19 is conducted to the clutch 10 by the ring gear support member 37, splines 18 and turbine drive shaft 15 that engages a member of the clutch 10.

Since the turbine 5 is locked to the converter housing 9 by means of clutch 10, the ring gear 19, pinions 20 and sun gear 23 are all locked against rotation also, placing the transmission in a direct-drive engine retardation mode, using the engine compression to slow the vehicle and save the vehicle brakes from excessive wear.

The method of applying the modified torque converter 1 in the present transmission provides much greater efficiency than it does when the conventional-type converter is used in the automatic transmissions. In the automatic transmissions, the torque converter is arranged to apply the output driving force of the turbine member *only* to do all the hard work. There is no mechanical connection between the engine and the work load in the automatic transmission; and the only work that is done by the converter housing and the engine is the driving of the pump gear. Slippage in this type transmission is very severe under certain conditions, even though it can multiply torque as much as two and one-half times.

The application of the modified converter 1 to the present transmission is much different in its performance because it operates as a load divider and its housing 9 drives a mechanical gear train that engages the vehicle wheels at all times while the turbine 5 drives a torque/speed modulator unit 3a; and the turbine member 5 only assists the mechanical gear train to perform its work. The only task the turbine member 5 has to do in the present transmission is to drive the ring gear 34 of the modulator 3a and ring gear 19 of the transmission 3, FIG. 1. The slippage that is encountered in driving the ring gears 34 and 19 is minimal and very necessary, because it allows the ring gears to slow down to multiply torque mechanically in the modulator unit 3a and the transmission 3 and the output torque delivered by the output shaft 26 is all mechanical, because it is a combination of the forces produced by the sun gear 23 driving pinions 20 against ring gear 19 and by sun gear 40 driving pinions 38 against ring gear 34; and the respective ring gears 19 and 34 have to be varied to provide variable ratio to be delivered to the axles 21, carrier 22 and output shaft 26, where the torque from the drive shaft 14 is combined with the torque from the turbine drive shaft 15 and this combined or modulated torque is delivered by shaft 26 to perform work 27. The ring gears can not freewheel backward or CCW because the kinetic force applied to the turbine blades 5 maintains the proper amount of driving force against ring gears 34 and 19 to provide engine relief under heavy load or to speed the ring gears up when the load is lightened.

The only task the turbine 5 has to perform then in the present transmission is to maintain sufficient torque against ring gears 34 and 19 to provide a variable react point for planet pinions 38 and 20 respectively to work against so that pinions 20 can force their axles 21 forward in a CW direction and drive carrier 22 and output drive shaft 26 in the performance of the work load 27; and this task is much easier than the task of driving the entire vehicle by turbine means with no mechanical assistance as is the case with the automatic transmissions.

The lock-up torque converters that are presently being used in the automatic transmissions that are programmed to lock up around 45 miles per hour are not recommended for use with this transmission, because it is necessary at times to add engine throttle and multiply torque for an emergency or a quick maneuver; and if the vehicle is cruising with a lock-up type converter, it will not permit the turbine 5 to function and increase torque for this emergency with the converter locked up at a predetermined speed.

In FIG. 1., shown in outline, is the location for a mode selection unit PRND. No L is shown for Low, because the low range will be automatically provided by the mechanical modulator unit 3a. No clutch or selecting device is shown in detail in the drawings for the present transmission. A mode selector unit has been developed but is not included in this specification.

The method by which the converter 1 is adapted to the present transmission causes it to be extremely agressive; and at low engine speed any slippage of the turbine 5 permits torque multiplication to develop under load by its manipulation of the modulator unit 3a.

In FIG. 1. when the vehicle brakes are applied to stop the drive shaft 26, it also stops carrier 22 and holds pinion axles 21 stationary, causing sun gear 23 that is fixed to input shaft 14 to drive the planet pinions 20 CCW and drive ring gears 19 and 34 CCW also. This action forces the ring gear 34 to turn CCW, forcing pinions 38 to rotate CCW; but the turbine 5 is applying CW rotation to the carrier 36 and driving the pinion axles 35 CW and at the same time, the engine driven sun gear 40 is moving CW, so the action of the axles 35 and the sun gear 40 both applying force CW causes the ring gear 34 to be dragged CW also by the pulling force and this prevents ring gear 34 from freewheeling CCW. The carrier 36 will move forward CW in the same direction that shaft 14 is being driven, but not as fast as shaft 14 is turning; and this action allows the turbine 5 to move forward to some extent while the vehicle shaft 26 is being held by the brake system and this action is easier on the whole converter system 1 than the same operation when using the same diameter gearing as described in FIG. 2. that causes turbine 5 to be completely stopped when a braking situation takes place.

The arrangement shown in FIG. 2. that has all gearing of equal diameter will hold the axles 35 stationary along with the shaft 15 and the turbine 5, causing greater turbulence within the converter 1 than would occur by using the larger sun gear 40 shown in FIG. 1. Just a small amount of slippage between the turbine 5 and the impeller 7 gives a greater slowing action to ring gear 34 by using the larger sun gear 40 to drive the pinions 38.

FIG. 1. and FIG. 2. both show a detail of the torque/speed modulator unit shown by arrow 3a. This mechanical modulator unit is absolutely necessary to the operation of the planetary transmission 3, because it controls the speed of the transmission ring gear 19 regardless of whether the transmission is in a driving mode, a drifting mode or just being stopped by the braking system. The engine E applys driving force to the transmission 3 through sun gear 23 and the vehicle applys load resistance to the planet pinions 20 by action of the drive shaft 26, carrier 22 and axles 21; and if the modulator 3a was not involved, ring gear 19 would be driven CCW and no work would be performed by shaft 26.

The modulator 3a is very similar to the transmission 3, but it receives its driving force from the turbine 5 through shaft 15 to drive carrier 36 by splines 18 and force pinion axles 35 in the direction the engine E is moving. The sun gear 40 is driven by the mechanical force of the engine E through converter shaft 14, and pinion 40 moves CW as well as carrier 36 that is forcing planet axles 35 forward; and with the axles 35 forcing the pinions 38 at their center axis and the sun gear 40 pulling on their gear teeth where they both mesh, ring gear 34 is actually being dragged along in the same CW direction and forcing ring gear 19 in the same direction and preventing ring gear 19 from freewheeling CCW, providing a react point within ring gear 19 for planet pinions 20 to drive against and force their mounting axles 21 to drive the carrier 22 and shaft 26 CW to perform work.

When multiplying torque, the shaft 26 and shaft 14 will move at different speeds and the two different speeds will be modulated through planetary units 3 and 3a, permitting a difference in speed between the turbine 5 and the impeller 7, because the mechanical gear train portion can not be varied except through the modified torque converter means. Instead of the turbine 5 dissipating part of the rotation being delivered by shaft 14 through its engagement with the turbine, the rotation is being modulated and returned to shaft 26 at a lower speed and higher torque through the planet pinion axles 21.

The mechanical force delivered by the converter drive shaft 14 balances its force through the planet pinions 20 against the turbine 5 to such a point that both the kinetic force and the mechanical force is applying equal driving force against the planet pinion axles 21, similar to the action of a mechanical load divider; and the balanced driving force causes the axles 21 to drive carrier 22 and shaft 26 at a modulated rate of speed.

FIG. 3. is a cross-section through the transmission showing a method of compounding the transmission gearing to provide increased torque output on shaft 26. All the new parts numbers shown in FIG. 3 correspond with those described in FIG. 1. and their relationship to parts shown in FIG. 1. have been identified by placing an "A" after all the parts numbers except the output drive shaft 26, which continues to be the output shaft 26 of the transmission.

The same ring gear speed is used for ring gear 19a as for ring gear 19, but the output shaft shown as 26 in FIG. 1. has been fitted with a sun gear 23a and driven by splines 24a; and it turns at a slower speed than sun gear 23, because of the reduction in the first unit 3, FIG. 1. that is supplying the input rotation to drive the sun gear 23a of the second unit, 41.

Sun gear 23a drives planet pinions 20a against ring gear 19a to drive axles 21a CW and carrier 22a CW and deliver extremely low speed to output shaft 26 to perform work 27. In a drifting mode the transmission will function the same as previously described by going into an engineretardation mode with a 1:1 ratio.

Different gear diameters may be used to provide different delivery speeds of output shaft 26. A combination of two different size planetary units may be geared together to provide different output rates than can be obtained by using two units with equal size diameters such as is shown in FIG. 3.

The model of this unit, FIG. 1. uses a four inch ring gear for gear 19 and four planet pinions 20 with a diameter of 1.333" and a sun gear 23 with a diameter of 1.333" and when the sun gear 23 is driven and the ring gear 19 is held against rotation, it produces a 4:1 reduction on shaft 26. If two units are geared together as shown in FIG. 3. using the same gear diameters, it will provide a 16:1 reduction on shaft 26.

Any amount of slippage in converter 1 by turbine 5 will permit ring gears 34 and 19 to relieve CCW and provide further reduction, in excess of what has been gained by compounding the gearing.

IN OPERATION

Assume a situation where the vehicle is moving along in a direct-drive mode and all the gearing in the gear train 3 and 3a is locked against rotation and the turbine blades 5, stator 6 and impeller 7 are all moving at the same speed with housing 9 and engine E. In this mode everything is turning as a single unit and not generating a lot of heat by churning up the hydraulic fluid. If a fairly steep grade is encountered in the roadway and the vehicle starts up hill, then the work load will increase even though the engine E is still laboring trying to move at the same speed under the same amount of throttle.

The vehicle will slow down under this extra load, causing the transmission shaft 26 to be slowed down also since the drive shaft 26 is geared to the vehicle driving wheels. As the shaft 26 is forced to slow down, it slows carrier 22 and axles 21 and the speed of planet pinions 20 is changed in relation to the sun gear 23, which maintains its speed because it is fixed to rotate at input engine speed.

When carrier 22 slows down, it slows axles 21 and, with sun gear 23 still rotating at the same speed, it drives planet pinions 20 CCW against ring gear 19 that is fixed to ring gear support 37 and the torque is conducted to gear 34 that engages pinions 38 on axle 35. Pinions 38 are driven CCW on axles 35 by the CCW rotation of ring gear 34 that is being slowed down by action of the vehicle. However, the sun gear 40 is still moving at the same speed CW as the input shaft 14 is moving and sun gear 40 also keeps gears 34 and 19 from freewheeling CCW because the pinions 38 are caged in between the ring gear 34 and the sun gear 40; and with the axles 35 having CW force applied by the turbine 5 and by the sun gear 40 turning in the same CW direction, gear 34 is being pulled along CW by the force of the turbine shaft 15 and the sun gear 40 by forcing pinions 38 to drag ring gear 34 along. This operation provides the modulation for the difference in the speed of shaft 14 and shaft 26 which are now moving at different speeds, allowing the turbine 5 to slow down and provide relief for the engine by allowing the engine to maintain its torque producing speed while shaft 26 is slowed down.

When the transmission is in direct drive ratio, all the gearing is locked against rotation in units 3 and 3a and the torque converter parts are all moving without churning up a lot of oil, and the stator member 6 is even going along for a free ride on the roller clutch 8. However, when the vehicle slows down with the engine still moving at the same speed, there develops a difference in speed between the output drive shaft 26 and the input drive shaft 14. This difference has to be modulated by the gearing of unit 3a. The slowing of shaft 26 causes the ring gear 19 to be forced to slow down by the sun gear 23 moving faster than the planet pinions 20 and causes ring gear 34 to also move slower since it is fixed to the same support member 37. The engine applies driving force through shaft 14 and at the same time through turbine shaft 15 by the turbine 5. This difference in speed causes a difference between the drive shaft 14 and the turbine shaft 15 also and the ratio is changed through the sun gear 40, pinions 38 and ring gear 34 by action of the axles 35 and sun gear 40 both applying driving force against pinions 38; and the pinions 38 and sun gear 40 pulls the ring gear 34 CW, maintaining a slower speed for gear 19 for the pinions 20 to operate against and continue to apply driving force to the carrier 22 through their axles 21 to drive the carrier 22 and deliver variable speed to shaft 26 to perform work 27. If an increased work load develops with the engine E still moving at the same speed, a difference in speed develops between the input engine drive shaft 14 and the output shaft 26. This increased work load actually overpowers the turbine member 5 and forces it to slow down and in doing so, it causes torque to develop through the action of the modulator unit 3a to provide relief for the engine by sacrificing speed for torque.

In a different situation, suppose that the vehicle has reached the top of the steep terrain and leveled out and back into direct drive ratio again and all internal moving parts cease rotating and move as a single unit. Then we encounter a long down-grade streach of highway and the operator releases part of the throttle and the engine is slowed down. Under this condition a drifting mode sets in and the driving force comes from the momentum of the vehicle trying to drift faster than the engine E is moving. This causes the transmission to go into a direct-drive lock-up mode and uses the engine compression to retard the speed of the vehicle by employing the one-way clutch 10 in the operation.

This retardation is provided by the one-way clutch 10 at the input end of the converter 1 by locking the turbine shaft 15 to the converter housing 9, causing both shafts 14 and 15 to move at the same speed. Input shaft 14 is fixed to the converter housing 9 by splines 11 and 12 and the one-way clutch 10 locks turbine shaft 15 to the same housing. This action locks the sun gear 23 and ring gear 19 together so they do not allow planet pinions 20 to move on their axles 21 and extends this 1:1 rotation on through to the output shaft 26 and to the vehicle wheels to retard the speed of the vehicle by using engine compression.

What is claimed:

1. A shiftless, continuously-aligning transmission having a continuously in meshed gear train mechanically connecting an engine crankshaft to an output drive shaft of a vehicle comprising, a torque converter including a housing and a fluid reaction turbine means rotatably mounted within said housing, means for rotatably connecting the engine crankshaft to said housing, an input drive shaft having first and second ends, said first end being connected to said housing so that said input drive shaft is rotatable therewith, a first planetary transmission gear means drivingly mounted adjacent said second end of said input drive shaft, a torque speed modulating gear means drivingly mounted adjacent said first planetary transmission gear means and spaced inwardly thereof relative to said second end of said input drive shaft, a ring gear support housing surrounding said first planetary transmission gear means and said torque speed modulating gear means and being rotatable with respect to said input drive shaft, two spaced annular ring gears fixedly carried by said ring gear support housing, said first planetary transmission gear means including a first sun gear mounted to said input drive shaft and first orbiting planet pinions which are mounted to a first carrier so as to be intermeshed with one of said ring gears, said first carrier being drivingly connected to the output drive shaft, torque speed modulating gear means including a second sun gear mounted to said input drive shaft and second orbiting planet pinions carried by a second carrier so as to be engagable between said second sun gear and a second of said ring gears, said second carrier being drivingly connected to a turbine drive shaft which extends in concentric relationship with said input drive shaft, and said turbine drive shaft being drivingly connected to said fluid reaction turbine means, whereby in direct drive, the input drive shaft and output drive shaft move at the same speed but when a load is encountered on the output drive shaft the relationship between the first planetary transmission gear means and said ring gears and said torque speed modulating gear means will create a load against the fluid reaction turbine means which will reduce the speed of the second planet pinions of said torque speed modulating gear means which will reduce the speed of said ring gears.

2. The transmission of claim 1 in which said sun gear of said torque speed modulating gear means is of a greater diameter than said first sun gear of said first planetary transmission gear means.

3. The transmission of claim 2 including a hollow input drive shaft drivingly connected to said torque converter housing, said hollow input drive shaft being coaxial with said input drive shaft, a main transmission housing surrounding said torque speed modulating gear means, said first planetary transmission gear means and said ring gear support housing and defining a cavity, a gear pump means mounted to said main transmission housing so as to be in fluid communication with said cavity, and said gear pump means being rotatably driven by said second end of said hollow input drive shaft.

4. The transmission of claim 3 in which said first carrier is integrally connected to the output drive shaft.

5. The transmission of claim 3 in which said first carrier includes a shaft portion, a second planetary transmission gear means mounted within said ring gear support housing, said second planetary transmission gear means including a third sun gear mounted to said shaft portion of said first carrier and third orbiting planet pinions which are mounted to a third carrier, a third annular ring gear fixedly carried by said ring gear support housing, said third planet pinions being intermeshed with said third sun gear and said third ring gear, and said third carrier being drivingly connected to the output drive shaft.

6. The transmission of claim 3 including a stator support shaft having first and second ends, said stator support shaft extending coaxially with and intermediate said input drive shaft and said hollow input drive shaft, a stator mounted within said torque converter housing, clutch means for mounting said stator to said first end of said stator support shaft, and said second end of said stator support shaft being fixedly mounted with respect to said main transmission housing.

7. The transmission of claim 3 in which said second planet pinions are of a lesser diameter than said first planet pinions, each of said first and second planet pinions being mounted to the first and second carriers, respectively, by pinion axles which are fixedly mounted to their respective carriers.

8. A shiftless, continuously-aligning transmission having a continuously in meshed gear train mechanically connecting an engine crankshaft to an output shaft of a vehicle comprising, a torque converter including a housing which is rotatably connected to the engine and a fluid reaction means rotatably mounted within said housing, an input drive shaft having first and second ends, said first end being connected to said housing so that said input drive shaft is rotatable therewith, a first planetary transmission gear means drivingly mounted adjacent said second end of said input driveshaft, a torque speed modulating gear means drivingly mounted adjacent said first planetary transmission gear means, a second planetary transmission gear means drivingly connected so as to extend from the output drive shaft into surrounding and spaced relationship with said second end of said input drive shaft, a ring gear support housing surrounding said first and second planetary transmission gear means and said torque speed modulating gear means, three spaced annular ring gears carried by said ring gear support housing, said first planetary transmission gear means including a first sun gear mounted to said input drive shaft and first orbiting planet pinions which are mounted to a first carrier so as to be intermeshed with one of said ring gears, said torque speed modulating gear means including a second sun gear mounted to said input drive shaft and second orbiting planet pinions carried by a second carrier so as to be engagable between said second sun gear and a second of said ring gears, said second carrier being drivingly connected to a turbine drive shaft which extends in concentric relationship to said input drive shaft, said turbine drive shaft being drivingly connected to said fluid reaction turbine means, said second planetary transmission gear means including a third sun gear rotatably carried by said first carrier of said first planetary transmission gear means and third orbiting planet pinions which are mounted to said output drive shaft so as to be engagable between said third sun gear and a third of said ring gears, whereby in direct drive, the input drive shaft and output drive shaft move at the same speed but when a load is encountered on the output drive shaft the relationship between the first and second planetary transmission gear means and said second and third ring gears will create a load against the fluid reaction turbine means which will reduce the speed of the second planet pinions of said torque speed modulating gear means which will reduce the speed of said three ring gears.

9. The transmission of claim 8 in which said second sun gear is greater in diameter than said first and third sun gears.

* * * * *